(12) United States Patent
Wilhelm et al.

(10) Patent No.: US 7,850,926 B2
(45) Date of Patent: Dec. 14, 2010

(54) PROCESS OF DISCONTINUOUS POLYCONDENSATION AND STIRRING REACTOR THEREOF

(75) Inventors: Fritz Wilhelm, Karben (DE); Ferdinand Finkeldei, Frankfurt am Main (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 767 days.

(21) Appl. No.: 10/181,076

(22) PCT Filed: Jan. 8, 2001

(86) PCT No.: PCT/EP01/00128

§ 371 (c)(1),
(2), (4) Date: Sep. 23, 2002

(87) PCT Pub. No.: WO01/51199

PCT Pub. Date: Jul. 19, 2001

(65) Prior Publication Data

US 2003/0139543 A1 Jul. 24, 2003

(30) Foreign Application Priority Data

Jan. 15, 2000 (DE) ................................ 100 01 477

(51) Int. Cl.
*B01J 19/18* (2006.01)
*C08F 2/01* (2006.01)

(52) U.S. Cl. .................. 422/131; 422/132; 422/134; 422/135; 422/138; 422/225; 422/228; 422/234

(58) Field of Classification Search ......... 422/131–138, 422/224, 225, 228, 229, 234; 159/11.3
See application file for complete search history.

(56) References Cited

U.S. PATENT DOCUMENTS

| 3,260,703 | A | | 7/1966 | Coggeshall | 526/71 |
| 3,480,404 | A | * | 11/1969 | Upson | 422/135 |
| 3,591,344 | A | * | 7/1971 | Schnock et al. | 422/135 |
| 3,617,225 | A | | 11/1971 | Kuehne et al. | 422/134 |
| 3,684,458 | A | * | 8/1972 | McCammon et al. | 422/135 |
| 3,761,059 | A | * | 9/1973 | Rothert et al. | 366/316 |
| 3,813,369 | A | * | 5/1974 | Latinen | 526/68 |
| 4,555,384 | A | * | 11/1985 | Morris et al. | 422/109 |

(Continued)

FOREIGN PATENT DOCUMENTS

DE 52 942 A 12/1966

(Continued)

*Primary Examiner*—Jennifer A Leung
(74) *Attorney, Agent, or Firm*—Norris McLaughlin & Marcus PA

(57) ABSTRACT

A process for the discontinuous production of granules from polycondensation polymers by precondensation of an oligomer at 5 to 400 mbar and subsequent polycondensation in a stirring reactor and subsequent granulation. In the vicinity of the outlet port, the density of the entraining surfaces lies between 1 and 8 $m^2$ per $m^3$ reactor space and constantly increases with increasing distance from the discharge region. Inside the reactor, there is a viscosity gradient between the region most remote from the discharge port and the zone of the discharge port. The thermal decomposition of the polymer melt flowing out of the reactor is compensated during granulation.

The stirring reactor with horizontal longitudinal axis approximately has the shape of a single or double truncated cone. The reactor has rotatable, vertical product entraining surfaces and stationary scrapers between the same.

2 Claims, 5 Drawing Sheets

U.S. PATENT DOCUMENTS

| | | | |
|---|---|---|---|
| 5,055,273 A | 10/1991 | Wilhelm et al. | 422/135 |
| 5,334,358 A | 8/1994 | Schuchardt et al. | 422/210 |
| 5,399,012 A | 3/1995 | Schuchardt et al. | 366/97 |
| 5,779,986 A | 7/1998 | van Endert et al. | 422/136 |

FOREIGN PATENT DOCUMENTS

| | | |
|---|---|---|
| DE | 37 43 051 | 6/1989 |
| DE | 40 18 069 | 12/1991 |
| DE | 41 26 425 | 2/1993 |
| DE | 44 47 421 | 9/1996 |
| DE | 10000527 A1 * | 7/2001 |
| EP | 0 719 582 | 7/1996 |
| GB | 1 435 767 A | 5/1976 |
| JP | 50 157265 A | 12/1975 |

\* cited by examiner

PROCESS OF DISCONTINUOUS POLYCONDENSATION AND STIRRING REACTOR THEREOF

This invention relates to a process for the discontinuous production of granules from polycondensation polymers with a dynamic viscosity in the range from about 100 to 1600 Pa·s at the respective polycondensation temperature by precondensation of a low-molecular oligomer at a pressure of 5 to 400 mbar (abs.) in any autoclave, subsequent polycondensation of the precondensate in a stirring reactor with horizontal axis and vertical product entraining surfaces as well as a discharge port, a vapor port, at least one filling port, and at least one recirculation port, and subsequent granulation of the polycondensate.

The invention also relates to a stirring reactor with horizontal axis and vertical product entraining surfaces as well as at least one filling port, at least one recirculation port, one vapor port, one outlet port and means for heating the reactor for the discontinuous polycondensation of a precondensate to obtain a polycondensation polymer with a dynamic viscosity in the range from about 100 to 1600 Pa·s at the respective polycondensation temperature.

BACKGROUND OF THE INVENTION

Processes and reactors for the batchwise (discontinuous) production of condensation polymers, in particular polyesters, in the melt phase, and the granulation of the product melts effected subsequent to the polycondensation are known. The particular importance of the batch process consists in its flexibility with respect to changed product formulations and in a low-loss change of the product formulation. Existing batch plants are mostly used for the synthesis of polyethylene terephthalate (PET) and copolyesters on the basis of PET. Subsequent to a first process stage for producing a prepolymer (as esterification product in the terephthalic acid process or as transesterification product in the dimethyl terephthalate process) a stirred autoclave is used for the polycondensation of the prepolymer under a vacuum. The stirred autoclaves of conventional plants are upright reactors with vertical stirrer shaft and special helical stirrers adapted to the bottom of the tank (hemispherical or conical).

In a PET batch process, for example, the disadvantages of these known stirred autoclaves are:
a) batch sizes up to a maximum of 4 to 6 t;
b) a geometrically limited, specific surface area of about 1.3 $m^2/t$ in the reactor;
c) a product conveyance limited in vertical direction (stirrer movement predominantly in horizontal peripheral direction);
d) a restricted intensity of the mass exchange with the practical consequence of longer reaction times, limited plant capacities and viscosities (IV$\leq$0.66 dl/g), forced final operating vacua (not more than 0.4 mbar abs.), an economic mode of operation only with an increased input of mechanical energy and elevated final polymer temperatures ($\geq$290° C.), losses of capacity and viscosity restrictions at reduced temperatures or operating vacua, final polymer temperatures increasing with increasing batch or plant size;
e) increased viscosity fluctuations, e.g. $\Delta IV \leq 0.03$ dl/g with IV=0.65 dl/g, in the granules due to the thermal decrease in viscosity of the melt during granulation as well as additional deviations of $\Delta IV_R \leq 0.01$ dl/g in the batch sequence;
f) polymer losses of about 0.65 wt-% during the regular rinsing of the discharge system prior to granulation;
g) increased acetaldehyde content and reduced color quality of the PET polymers.

To accelerate the reaction in the conventional autoclave, a surface increase up to 1.5 times the amount by inclining the container axis up to 48° from the vertical has been proposed (EP 0 753 344 A2). However, objections against this measure result from a complicated, expensive mechanism of the stirrer and the uncertainty as regards the control of transverse forces and unbalanced masses.

Better possibilities for increasing the specific product surface (by a factor of about 15 to 30) and for increasing the product viscosities can be realized in a lying ring-disc reactor with entraining surfaces of the stirrer rotating substantially in vertical paths and with free-falling films (mists) inside the ring discs (U.S. Pat. Nos. 3,499,873 and 3,617,225). The main problem of cylindrical ring-disc reactors tested in batch operation was an insufficient drainage behavior of the apparatus. This is even more true for ring-disc reactors with a frustoconical shape and with the product outlet in the part of the reactor with the smallest diameter. Non-walkable reactors also have assembly problems during the installation of baffle plates. The reactors including ring discs carried by a cage, which are described in the U.S. Pat. No. 4,540,774, are only designed for the continuous operation.

The polycondensation tank tapered at both ends, which is described in D.D. patent 52942, exhibits a better drainage behavior. The scoop-like stirrer elements, however, limit the formation of free product surfaces and are not suited for higher viscosities.

If one sticks to the concept of a stirring disc autoclave with individual stirring disc elements separated by scraper elements (U.S. Pat. Nos. 3,346,242 and 3,880,407) in favor of high final polymer viscosities (e.g. IV $\leq$0.82 dl/g in the case of PET), there are further problems as regards the reduced intensity of the mass exchange at the container wall in the case of low viscosities and the restricted heat transfer. Under technical production conditions with a relative filling level h/D=0.4 and usual rotational speeds $\leq$8 rpm, PET has the disadvantage of
 the necessity of preheating the condensate to about 280° C.,
 a restricted polycondensation performance with a maximum of 7 batches per day, and
 a reduced polymer color and increased viscosity fluctuations.

It is the object of the present invention to minimize the aforementioned disadvantages, and in particular substantially improve the existing potential of batch plants to form multipurpose purpose plants by a more efficient polycondensation technique and a more uniform quality of the granules.

SUMMARY OF THE INVENTION

In accordance with the invention, this object is solved by a process and a stirring reactor as defined in the claims.

The essential features of the invention are:
(1) pre-evacuation of the precondensate under a vacuum of 5 to 400 mbar, in the case of polyester 30 to 300 mbar, preferably 60 to 240 mbar (abs.),
(2) use of reduced temperatures,
(3) accelerated dissolution of the residual polycondensate originating from the preceding batch in the polycondensate mixture in the reactor and in the outer pump circuit due to an initial rotational speed which at the beginning of the polycondensation is at least 2.5 times as large as at the end of the polycondensation, and due to correspondingly higher radial accelerations at the outer edges of the entraining surfaces, which in the stirring reactor with shaft-supported stirring discs preferably on average exceed the amount of the gravitational acceleration,
(4) development of a viscosity profile in the stirring reactor and limitation of the polymer residue in the reactor due to the particular reactor geometry,
(5) reduction of the polycondensation time in the standard process, e.g. in the case of PET to $\leqq 2.2$ h and batch numbers of $\geqq 8$ per day.

In accordance with the invention, the objectives to be fulfilled by an advanced batch process as regards an accelerated process with restricted process temperature and simultaneously increased product batches, with increased granulation times to restrict the granulator efficiency as well as the request for a viscosity of the polymer products which is variable within wide limits and undergoes minimum fluctuations can be realized by means of
(1) a separate production of precondensate under a vacuum of 5 to 400 mbar at limited temperatures in any kind of autoclave,
(2) the subsequent polycondensation of the precondensate in a specially designed lying stirring reactor with a plurality of parallel stirring discs as carriers of vertical entraining surfaces and a common horizontal axis of rotation, and
(3) the subsequent granulation by maintaining a vacuum in the reactor (about 10-100 mbar) and at moderate product temperatures.

DETAILED DESCRIPTION

The inventive discontinuous stirring reactor has a housing which apart from the inlet and outlet ports is rotationally symmetrical with respect to the horizontal container axis, circular in a vertical sectional view and tapered in the direction of one or both sides of the cover. On one or on both sides of the cover an inlet port and at least one recirculation port is disposed, where inlet port and recirculation port may also be identical, at the drainage bottom an outlet port is disposed, and at the vertex a vapor outlet is disposed. The reactor correspondingly has the shape of a lying, unilaterally tapered apparatus, optionally with cylindrical connecting piece at the side with the largest diameter, or of a lying bilaterally tapered apparatus, optionally with cylindrical intermediate piece. The taper may be spherically curved on the basis of housing elements in the form of a spherical segment or an ellipsoid or preferably have a conical design due to a straight truncated cone. In the case of a bilateral taper, the taper may be identical on both sides or it may also be formed differently or of different lengths. The conical or curved taper may also be realized by corresponding installations in a cylindrical housing. The reactor is preferably heated by means of a heating medium circulating in a heating jacket.

The design of the stirring disc elements may generally be effected with different geometries. Relevant for the process are
a) the space density of the entraining surfaces, which lies between 1 and 8 m$^2$/m$^3$, preferably in the range from 3 to 6.5 m$^2$ per m$^3$ reactor space in the vicinity of the discharge port of the reactor, constantly increasing with increasing axial distance from the discharge port up to a value which in the axially most remote regions is higher by 5 to 35%, preferably by 10 to 30% (the reactor space is defined here as local, differential reactor space);
b) a concentration of the entraining surface to the outer container zone close to the wall;
c) free edge zones and/or interruptions of the outer stirrer contour and/or realization of a permeable structure of the entraining surfaces (like a perforated plate, grid or net) for the accelerated axial (and radial) discharge of the melt when draining the reactor while the stirrer is standing still;
d) a limitation of the material projection surface of massive entraining surfaces in axial direction to about 18 to 45% and of perforated entraining surfaces to about 7 to 33% of the reactor cross-section;
e) mounting the entraining surfaces on a common shaft via individual hub/spoke connections with 2 to 6 spokes per stirrer unit, or alternatively at a cage of selectively 5 to 9 longitudinal girders along the housing shell and cage holders at the side of the cover on the outer shaft ends by attaching the stirring discs to the cage girders.

When the stirring discs are held at a cage, they are preferably given a polygonal outer contour or a ring shape with radial projections at the points of attachment. An improvement of the drainage behavior is achieved by means of perforated stirring discs (perforated plate, grid or wire gauze) in the cage instead of compact entraining surfaces. In the design with stirring disc cage a substantially concentric arrangement of container axis and rotor axis is provided, whereas in the case of parallel stirring elements on a common shaft both a concentric and an eccentric positioning of the stirrer axis is possible depending on the construction of the stirring discs.

With respect to the design of the reactor, the object of quickly draining the stirring reactor to a large extent during granulation leads to substantially reduced overall lengths and increased diameters, correspondingly short flow paths and a minimum number of flow barriers as compared to the prior art. For instance, for the case of apparatuses which all have a horizontal longitudinal axis, namely:
I: unilaterally tapered apparatus with the outlet at the drainage bottom,
II: unilaterally tapered apparatus with cylindrical connecting piece at the side with the largest diameter and outlet at the drainage bottom of the cylindrical part,
III: bilaterally tapered apparatus with cylindrical intermediate piece and outlet at the central drainage bottom, favorable drainage conditions are obtained with respect to the nominal or maximum diameter D with relative lengths L corresponding to the subsequent Table 1:

TABLE 1

| Apparatus Case | I | II | III |
| --- | --- | --- | --- |
| L/D, maximum | <1.0 | <1.3 | <1.8 |
| L/D, preferred | $\leqq 0.7$ | $\leqq 0.9$ | $\leqq 1.3$ |

With a given batch size, apparatus type III exhibits the smallest container diameter and offers the largest reserves for planning large capacities.

Another essential feature of the inventive process is the increased constancy of the viscosity in the granules, which is realized during the polycondensation by compensating the thermal decrease in viscosity during granulation as a result of the establishment of a corresponding viscosity gradient between the place of product withdrawal and the product zones in the stirring reactor most remote from the outlet. Initially, the polycondensate flowing out of the reactor last has a higher viscosity than the product leaving the reactor first, but in the course of granulation this viscosity is reduced due to the thermal decrease to such an extent that during the entire course of granulation product melt of approximately constant viscosity is supplied to granulation. The inventive development of a differentially higher viscosity primarily relates to the axially remote product zones, but also to the more viscous products adhering to the stirring discs, which upon stopping the stirrer flow off with a delay and accumulate at the sump surface. In addition, the extent of the decrease in viscosity inside the reactor during the discharge of the polymer melt can be influenced by applying a vacuum program during the discharge phase.

In terms of apparatus, this viscosity profile is realized
by means of a plurality of parallel, vertical stirring discs,
by means of unilateral or bilateral tapers of the stirring reactors on one or on both sides of the cover,
by means of a locally decreasing, relative sump level h/D in the tapered region, equivalent to a specific product surface and polycondensation rate at the stirring discs increased in the direction of taper,
by means of a density of the entraining surfaces of the stirring discs which in the tapered regions is successively increasing with increasing distance from the product outlet.

In particular in apparatus type III with bilateral, tapered ends, a cylindrical intermediate piece and central bottom drainage, the at first contradictory objectives of an improved constancy of the viscosity and an effective drainage of the apparatus can be optimally realized with a lying polycondensation reactor.

In accordance with the invention, the density of the entraining surfaces in the axially outer regions is by 5 to 35%, preferably by 10 to 30% larger than in the product discharge zone. This can be realized by different distances between the stirring discs. Preferably, in the case of a constant axial distance between the stirring discs in the range from 80 to 180 mm, the increased density of the entraining surfaces in the tapered reactor zones is substantially achieved with a stirring disc width that is increasing relative to the diameter. When fitting more tapered apparatuses with ring discs, a constant ring disc width is sufficient to increase the density of the entraining surfaces, independent of the diameter.

In accordance with the invention, the angle of inclination of the truncated cone with respect to the horizontal lies in the range from 5° to 45°, preferably between 10° and 30° in the case of a unilaterally conical reactor and between 20° and 38° in the case of a bilaterally conical reactor.

Another feature of the inventive process including a stirring reactor is the maximization of the polycondensation efficiency by means of a variable rotational speed which is not limited by the product bridges between the stirrers and by means of a constant surface renewal of parts of the melt transported by the entraining surfaces, spread at the stirring discs and exposed to the vacuum existing in the reactor. This objective can be achieved in the case of the stirring reactor with continuous shaft and parallel, individual stirring discs by means of baffle plates disposed centrally between the stirring discs above the product sump, for instance in the vicinity of the centre of the reactor, where the rotating stirring discs emerge from the product sump, and by means of a transverse girder guided as an extension of the baffle plate up to the vicinity of the shaft for scraping all internally disposed entraining surfaces such as spokes and hubs. Moreover, this transverse girder promotes a delayed communication of the product in the case of a standstill of the stirrer and the inventive enrichment of more viscous film products at the sump surface at the beginning of and during the granulation process.

Instead of baffle plates attached to a transverse girder, there may also be used baffle plates without transverse girder, which are held at the side of the shell, reach up to the stirrer shaft and are preferably tapered in the direction of the shaft, preferably with a loose nose guided up to the shaft. After the assembly of the stirring elements, such baffle plates may for instance be inserted from the outside through corresponding recesses in the reactor shell between the stirring disc elements and be attached to the wall. This is particularly advantageous in the case of non-walkable reactors, where the internal assembly is problematic.

Another feature of the inventive process is the rapid reactive dissolution of residual polymeric products of the preceding batch in the stirring reactor by initially increased shear rates at the reactor walls and at the stirring discs in the range from 2.5 to 250 $s^{-1}$, preferably 10 to 125 $s^{-1}$, during 15 to 30% of the entire polycondensation time to accelerate the polycondensation and to avoid product discolorations. (The shear rates are defined as ratio of the peripheral speed of the stirrer to the local gap width.)

Another feature of the inventive process including stirring reactor and shaft-supported stirring discs is the production and maintenance of a vapor space free of residues. This objective is achieved by a separate production of the precondensate under a vacuum in the range from 5 to 400 mbar at limited temperatures, as well as by the relative filling level of the stirring reactor with precondensate of h/D=0.26 to 0.49 (the calculated maximum filling level at the discharge port, to be derived in a first approximation from the ratio of the product volume to the reactor volume in the cylindrical substitute reactor with a nominal diameter D and the same volume) and initially increased minimum rotational speeds, at which the radial acceleration at the outer stirrer edge for an initial duration of about 15 to 30% of the total polycondensation time, in the case of PET of about 20 to 30 minutes, and at least 5 times as high as at the end of the polycondensation is adjusted preferably equal to or larger than the gravitational acceleration with a continued reduction later on.

In accordance with the invention, the production of products with increased molecular weight or increased final viscosity is effected in the polycondensation by a restricted filling level (h/D≦0.35), increased free surfaces, a restriction of the increase in temperature by means of a progressively reduced speed level, a polycondensation time prolonged within certain limits, and an higher final vacuum.

An inventive variant of a unilaterally tapered stirring reactor with cage mounting and inner baffle plates is obtained when instead of usual cage reactors with bilateral shaft outlets an internal bearing with fixed bearing pin is effected at the reactor end with the larger diameter, where at the extension of said bearing pin towards the interior of the reactor the at least one, preferably two longitudinal girders are anchored, via which in the raised position (about 8 to 10 o'clock a.m.) baffle plates are guided between the stirring discs and optionally in the lowered position (about 4 to 5 o'clock p.m.) spiked scrapers are mounted in the vicinity of the stirring disc for an improved mixing technique. By means of the stirring disc cage, product conveyance and shearing efficiency are substantially increased in peripheral direction along the reactor wall, so that a speed level reduced to about 25 to 50% is obtained for the cage reactor as compared to the reactor concept with shaft-supported stirring discs.

Another feature of the inventive process is an inexpensive granulation process with fine adjustment of the viscosity. This is achieved
by means of a discharge pump for the controlled circulation of the product melt from the discharge port via circulation lines to the remote sides of the cover (or the directly adjoining sides of the shell) of the reactor during the polycondensation and to a throttled extent during granulation, and for the selective use of the circulation lines for an initial heating and future cooling of the circulated polycondensate mixture, by adapted choice of the polymer viscosity at the beginning of granulation, by discharge of the polymer batch under a controlled vacuum, preferably controlled in dependence of the viscosity, in the reactor (0.5 to 150 mbar abs.), by moderate product temperatures during polycondensation and during granulation, and preferably by local measurement and control of the viscosity, in particular at the beginning of and during granulation.

The process and the stirring reactor in accordance with the present invention are suited for the discontinuous polycondensation in the melt phase of any polycondensation polymers such as polyesters, polycarbonates and the corresponding copolymers, where the final dynamic viscosity, measured at the respective polycondensation temperature, should lie in the range from about 100 to 1600 Pa·s. The inventive reactor can also be used for the polycondensation of high-viscosity polyamides, which polycondensation is then, however, effected at normal pressure, and the preceding precondensation is effected at excess pressure. Higher or lower viscosities are possible, but the inventive advantages are less obvious. There are preferably used polyesters such as polyethylene terephthalate or naphthalate, polytrimethylene terephthalate or polybutylene terephthalate, and particularly preferably polyethylene terephthalate with an intrinsic viscosity in the range from 0.56 to 0.82 dl/g corresponding to a dynamic viscosity of 200 to 1200 Pa·s.

In summary, the inventive process including a stirring reactor has the following advantages as compared to conventional batch processes:

1. Increased process quality due to
    reduced temperatures or thermal product loads during the entire process, in particular during polycondensation and granulation with limited final temperatures, in the case of polyesters in the range from $(T_F+10)$ to $(T_F+40)°$ C., where $T_F$ is the melting temperature of the polymer,
    significantly reduced process dwell times in the stirring reactor,
    permanent, direct control of viscosity in an outer product circuit of the polycondensation reactor,
    batch discharge under a vacuum by means of a circulating pump,
    avoidance of noxious residues due to a rapid, reactive dissolution of product residues in the new batch with sufficiently high circulation rates (of about 3 batches per hour) in the outer product circuit, and inside the reactor with maximized rotational speeds and radial accelerations of the vertical entraining surfaces during the initial evacuation phase of the stirring reactor.

2. Improved economy due to
    increased batch numbers of e.g. in the case of PET 10 (±2) batches instead of 5.75 (±0.75) batches per day in conventional autoclaves,
    increase of the batch size by a factor of 2 to 3 and of the polymer capacity by a factor of 2 to 5 as compared to conventional autoclaves,
    reduced final vacua of e.g. in the case of PET an absolute pressure of $\geq 0.6$ mbar in the stirring reactor instead of an absolute pressure of $\leq 0.4$ mbar in the conventional process,
    possible longer discharge times of e.g. about 42 min instead of 30 min with a controlled vacuum in the reactor,
    reduction of the polymer losses during granulation due to dead space by means of increased batch sizes and prolonged discharge times, in accordance with the invention without quality losses,
    reduced formation of by-products and reduced use of raw material,
    discharge of polymer by means of a pump at lower operating costs than in the conventional discharge of polymer by means of nitrogen pressure.

3. Increased polymer quality due to
    particularly high constancy of the polymer viscosity in the granules,
    minimum polymer discolorations,
    reduced contents of acetaldehyde in the production of bottle polyester;

4. Increased flexibility due to
    possibility for increasing the viscosity, in the case of PET up to IV$\leq$0.82 dl/g,
    possibility for the alternative production of other polycondensation polymers.

BRIEF DESCRIPTION OF THE DRAWINGS

The inventive stirring reactor will subsequently be explained in detail with reference to exemplary, schematic drawings, in which.

Figure 1:
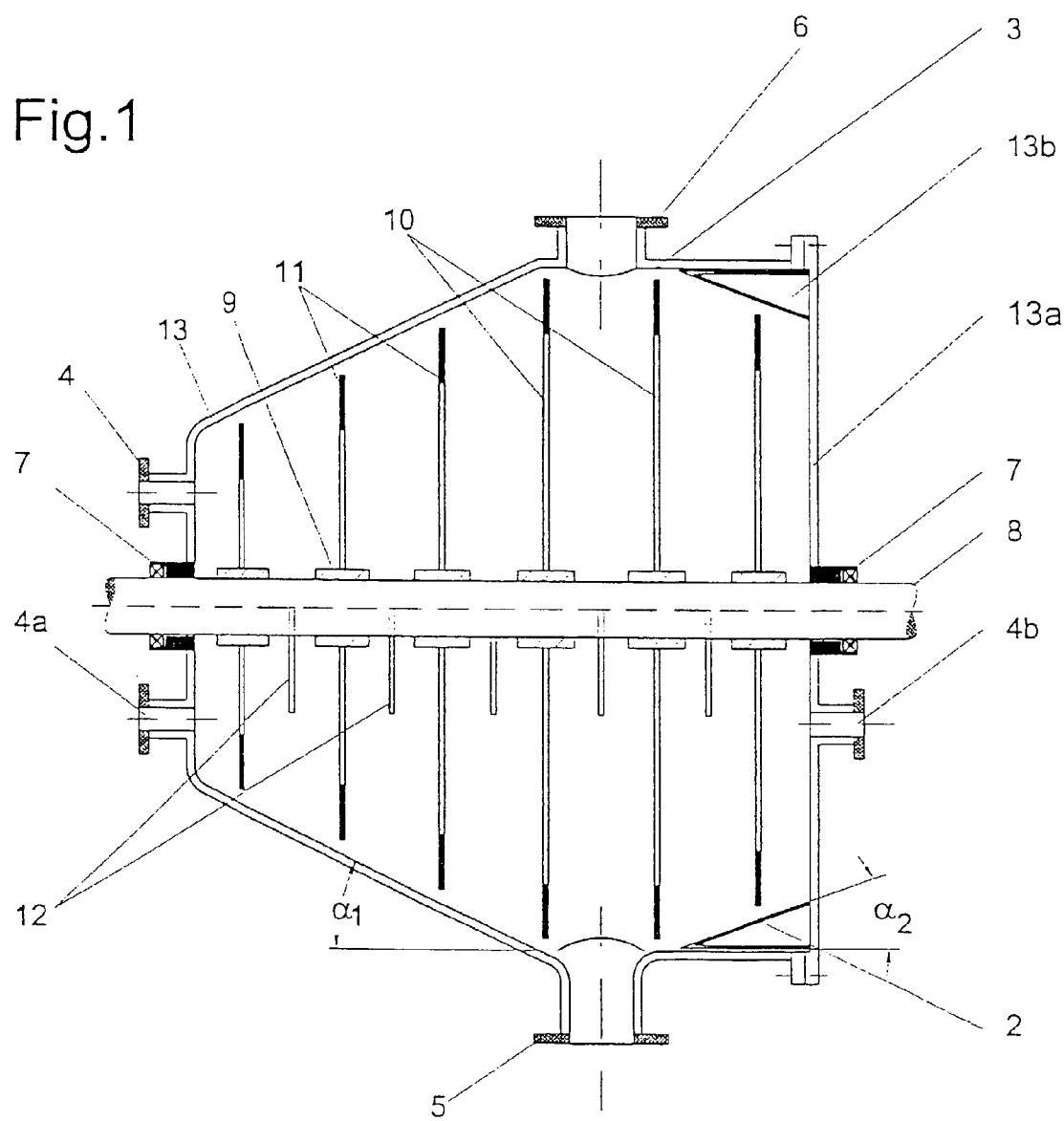
FIG. 1 shows a longitudinal section of a biconical stirring reactor with cylindrical intermediate portion and stirring discs held on an axial shaft.

The reactor represented in FIG. 1 substantially comprises a lying truncated cone (1) with the angle of inclination $\alpha_1$, a cylindrical portion (3) of the same diameter adjoining the larger diameter of the truncated cone, and the partitions (2) by means of which the region of the cylindrical portion (3) with the angle of inclination $\alpha_2$, which faces away from the truncated cone (1), is likewise shaped as a truncated cone. The reactor can be heated via a heat-transfer medium circulating in the heating jacket (13, 13a, 13b). In the side walls, the precondensate inlet port (4) is provided and in the lower reactor region the product recirculation port(s) (4a, 4b) is/are provided, at the lowest point of the reactor the product outlet port (5) is provided and at the highest point the vapor outlet port (6) is provided. Instead of the lateral inlet port shown here, the same can also be disposed in the upper reactor region beside the vapor outlet port with or without baffle plate, which provides for rinsing the upper reactor wall. The horizontal stirrer shaft (8), which is sealed against the atmosphere in the shaft passages (7) and is supported externally, may be arranged concentrically or slightly eccentrically with respect to the longitudinal axis of the reactor, depending on the geometry of the entraining surfaces (11) of the stirrer. At the shaft (8), the stirring discs (10) with the entraining surfaces (11) are held for instance via a hub-spoke connection (9). The stirring discs (10) are arranged with equal distance from each other and have a diameter adapted to the shape of the reactor. A large diameter in the vicinity of the drainage bottom and a small diameter in the tapered region of the reactor with a horizontal longitudinal axis of the reactor mean a higher density of the entraining surfaces in the tapered region of the reactor with constant width of the stirring discs and as a result, in conjunction with other measures, a more viscous polycondensate in the tapered region of the reactor. In particular in the case of reactors with a small cone angle of inclination α, the stirring discs (10) may also be arranged at different distances from each other, which distances increase with increasing diameter of the reactor. When the stirring discs (10) are rotating, one static baffle plate (12) is each disposed centrally between two stirring discs (10) at the level of the entraining surfaces (11) emerging from the product sump at about half the reactor height.

Figure 2:
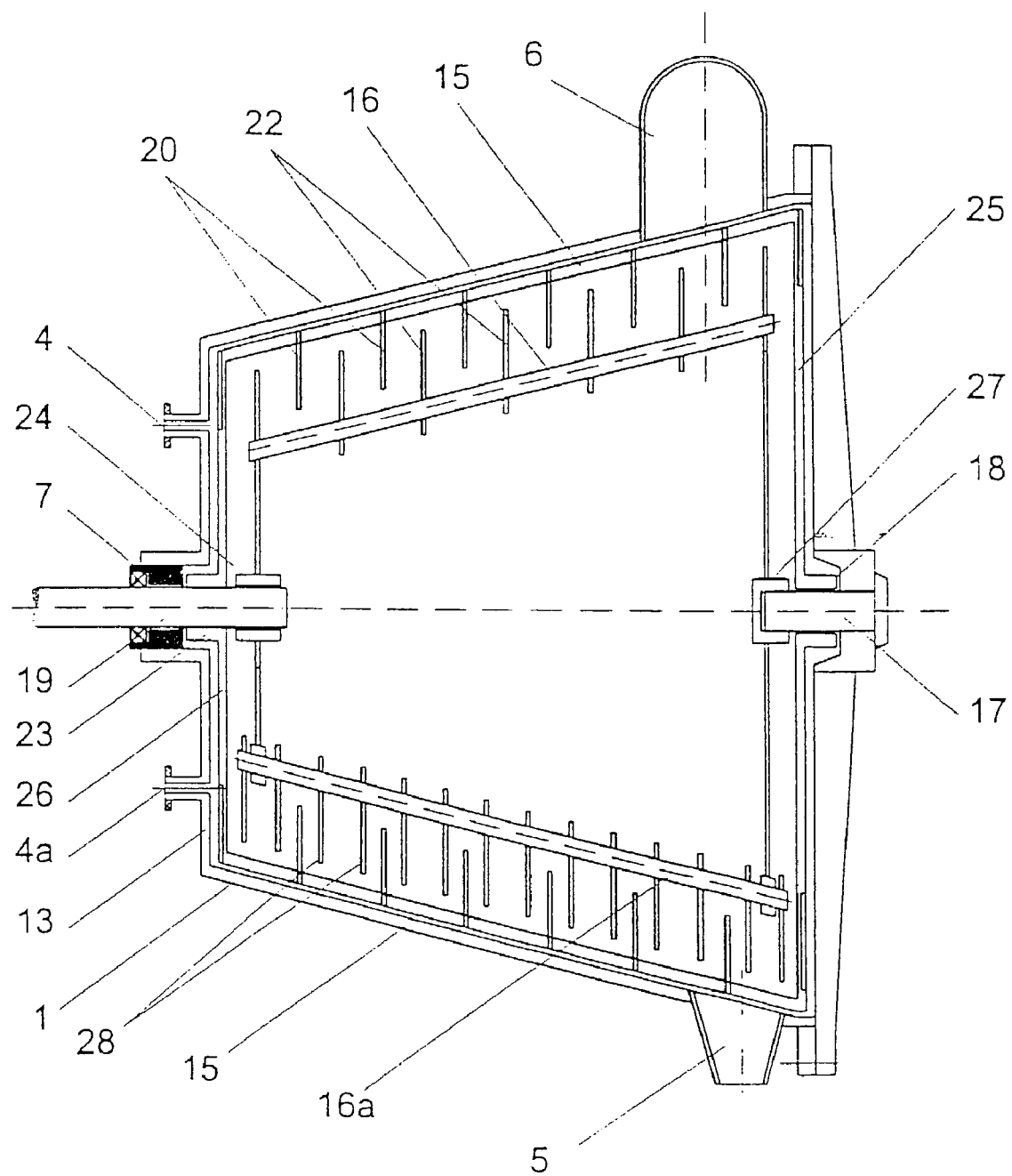
FIG. 2 shows a longitudinal section of a frustoconical stirring reactor with stirring discs held in a cage.

FIG. 2 shows another inventive stirring reactor in the form of a lying, simple truncated cone (1) with horizontal longitudinal axis, comprising a precondensate inlet port (4), a vapor outlet port (6) and a product outlet port (5) at the drainage bottom. In this case, the stirring discs (20) are attached to longitudinal girders (15), which together with the terminal spokes (25, 26) or perforated plates form a rotatable cage. This cage has the same shape as the reactor and is smaller than the same just by such an amount that the product is wiped away from the reactor walls, but not scraped off. In the operating condition, the cage including the stirring discs (20) is rotated via the shaft (19) and the fixed bearing (23). On the side opposite the shaft (19), the cage is supported on a loose internal bearing (18) with a bearing pin (17) extending into the interior of the reactor. Baffle plates (22) and scrapers (28) are each attached to at least one longitudinal girder (16, 16a), which form a stationary stator system and for a better illustration are represented rotated into the vertical sectional plane. The stator system has a firm support (27) at the bearing pin (17) and a loose support, e.g. a slide bearing (24), at the shaft (19) protruding into the interior. The radial distance of the stationary girders (16, 16a) from the longitudinal girders (15) of the rotatable cage is oriented at the inside diameter of the stirring discs (20). Instead of individual stator girders there may also be used a grid of the baffle plates with 2 to 4 longitudinal bars. With the concept of the internal bearing (18) there is also provided an individual shaft passage (7) with integrated sealing.

Figure 3:
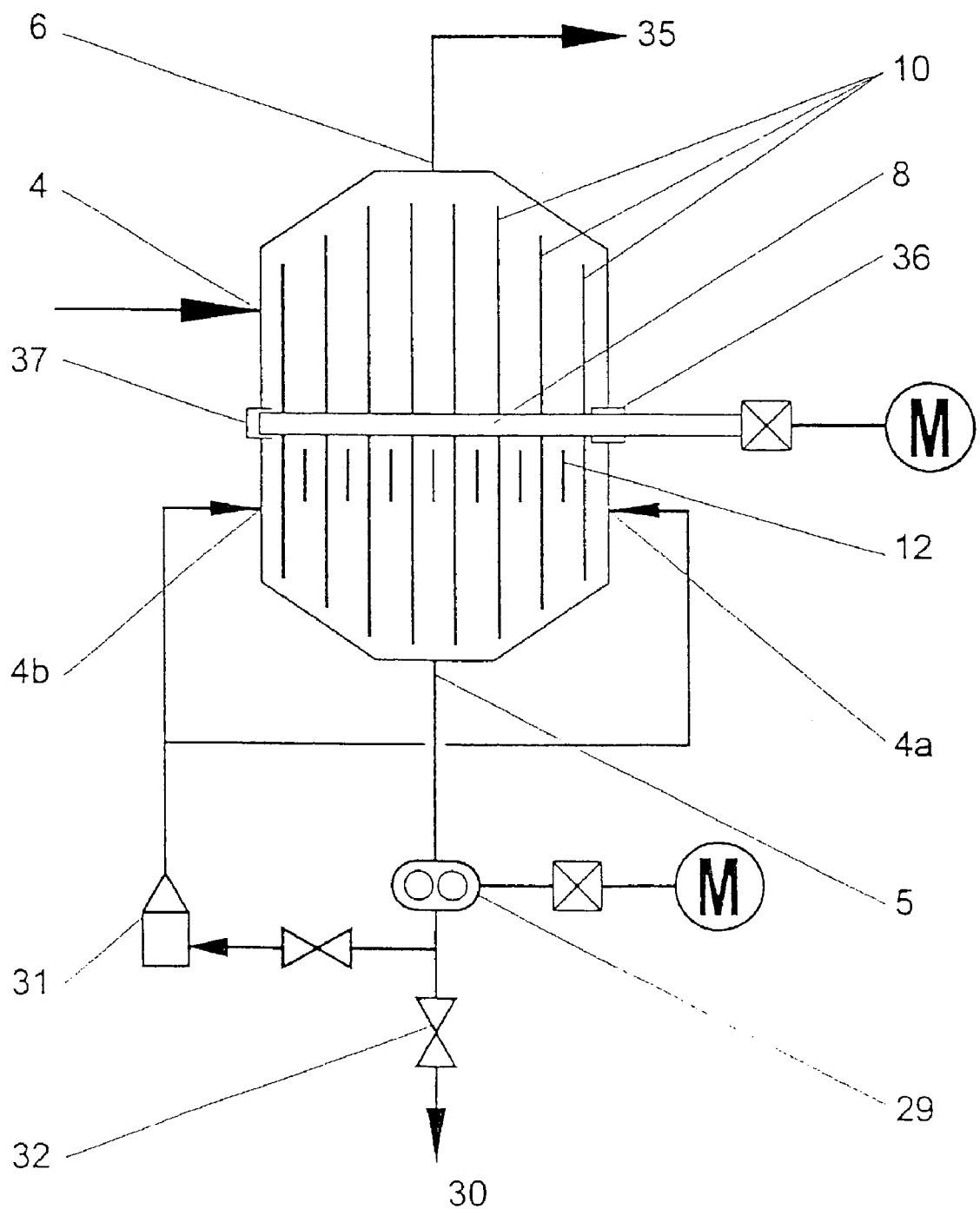
FIG. 3 shows a biconical, symmetrical stirring reactor with the product streams.

FIG. 3 represents the product guidance by the example of a symmetrical, bilaterally conically tapered reactor comprising stirring discs (10) supported by the shaft (8) and baffle plates (12).

The shaft (8) is normally held via a fixed bearing (36) and an internal slide bearing (37). At the beginning, the precondensate is introduced through the port (4). Via recesses or perforations in the stirring discs, the precondensate is virtually spontaneously distributed along the entire length of the reactor. For a better exchange of product, polycondensate mixture is permanently withdrawn at the outlet port (5) during polycondensation and, while the valve (32) is closed, is recirculated to the tapered regions of the reactor by means of the pump (29) via the viscosimeter or the pressure gauge (31) and the product recirculation ports (4a) and (4b). Depending on the reactor geometry, the amounts of product recirculated via the ports (4a) and (4b) may be the same or different, where the total amount circulated in the course of polycondensation is about 200 to 1000%, preferably 300 to 600% of the entire batch, and the amount circulated during granulation is about 10 to 30%. In the case of unilaterally conical reactors, as they are represented in FIG. 2, the second recirculation port is omitted. By means of jacket tubes, for instance, the circulation lines are formed as heat exchangers, by means of which a specific temperature control in the sense of an initial heating and future cooling can be performed. The vapors obtained during polycondensation leave the reactor via the port (6) and then flow to the vacuum generator (35). At the end of the polycondensation, the recirculation of the polycondensation mixture is greatly throttled to about 10 to 30% of the entire batch, and the stirrer is shut off, the valve (32) in the outlet line is opened, and the polycondensate is discharged from the reactor by means of the pump (23) and supplied to a granulator (30).

Figure 4A:
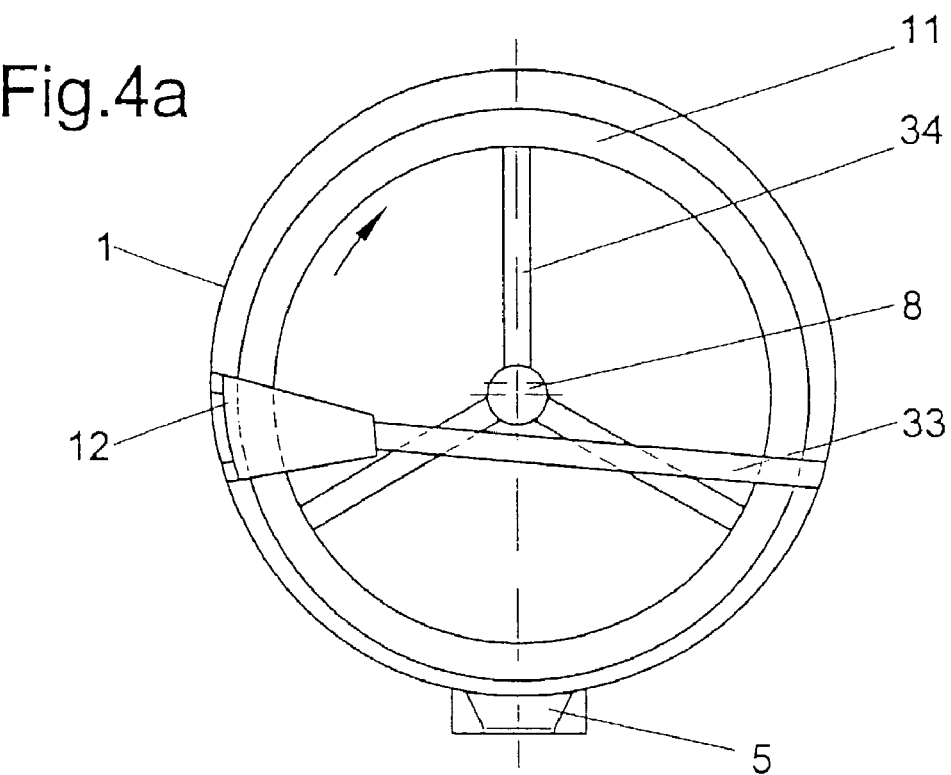
FIG. 4a shows a cross-section of a stirring reactor with stirring discs held on a horizontal shaft and a transverse girder.

FIG. 4a shows a cross-section through a stirring reactor as it is represented for instance in FIG. 1, where the outer entraining surfaces (11) of the stirring discs are represented by way of example as ring discs by omitting recesses or perforations. To both sides of the reactor wall (1) there is attached a transverse girder (33) with terminal baffle plate (12). The transverse girder (33) is arranged such that on the one hand the baffle plate (12) can be placed in that region of the reactor in which the rotating entraining surfaces (11) emerge from the product sump and on the other hand a shearing and scraping of the stirrer shaft (8) and the spokes (34) of the stirring discs is possible. In the example shown here, the stirring disc (34/11) is installed slightly eccentrically, so that vapor passes through the vertex region of the reactor at reduced speed. The production outlet port 5 at the container bottom is expanded for an efficient discharge.

Figure 4B:
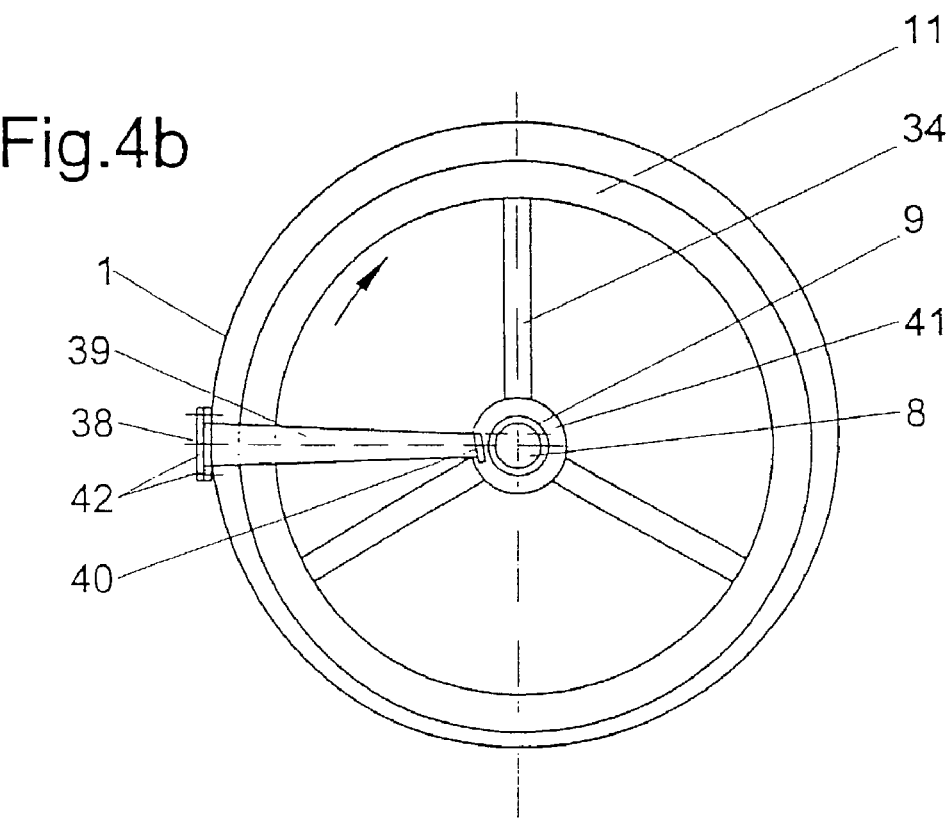
FIG. 4b shows a cross-section of an stirring reactor with stirring discs held on a horizontal shaft and an inserted baffle plate.

FIG. 4b shows the cross-section of an alternative stirring reactor, comprising a stirring disc comparable to FIG. 4a with the entraining surface components (11) and (34) and a hub (9) on the shaft (8). The housing (1) has an opening (38) through which the baffle plate (39) with a sliding block (40) between hub rings (41) has been brought into the illustrated position and is held in a flange connection (42).

Figure 5:
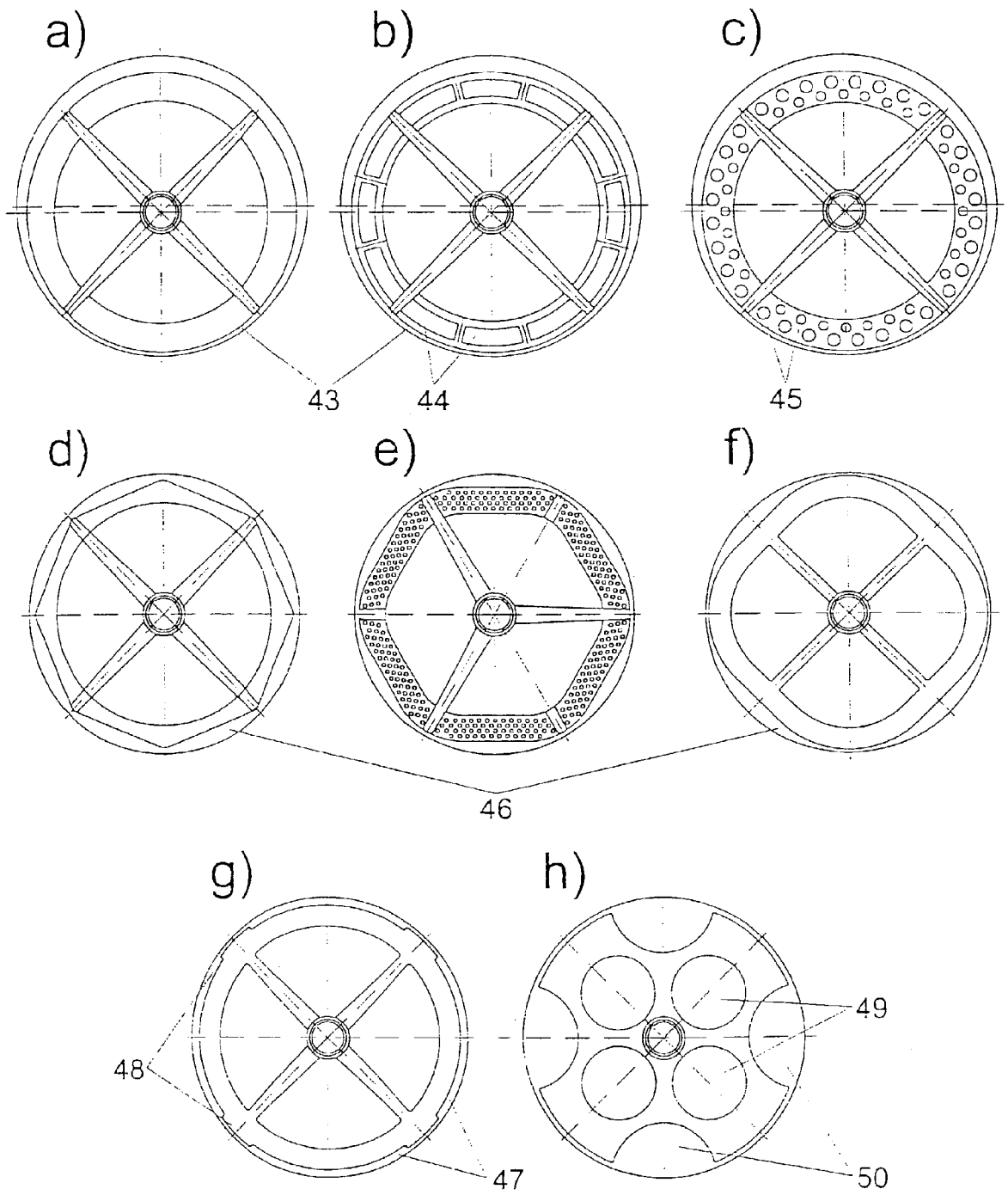
FIG. 5 shows stirring discs of different geometries.

FIG. 5 represents examples of various stirring disc geometries, which are all represented with spokes and stirrer shaft holder. When the spokes are omitted, the entraining surfaces shown here can also be held at the longitudinal girders of a cage as it is shown in FIG. 2. The conventional ring disc with eccentric stirrer shaft, as it is shown in FIG. 5a, has a reduced capacity for axial communication due to the restricted gap (43) between the container bottom and the smooth, closed entraining surfaces. For an unimpeded discharge of product, a product outlet zone expanded in the vicinity of the outlet port is required. Therefore, entraining surfaces with perforations and/or recesses are preferred in general. The grid discs as shown in FIG. 5b and the perforated discs as shown in FIG. 5c lead to an improved communication and idling behavior due to windows (44) or bores (45) in the outer entraining surfaces.

Apart from perforations of the outer region of the entraining surfaces, preferably with a concentric stirrer position, FIGS. 5d, 5e and 5f illustrate the realization of larger gaps (46) between stirring discs and housing wall on the basis of a polygonal structure. With regard to a stable film formation and non-pulsating sump flow, the circular inner contour of the stirrer as shown in FIG. 5d is preferred.

What is particularly preferred in accordance with FIG. 5g is an expanded annular gap (47), interrupted by knob-like projections (48) in conjunction with a specific idling position of the stirrer.

The stirring disc concept represented in FIG. 5h provides an alternative combination of large circular openings (49) in the centre of the stirring disc and semicircular recesses (50) between stirrer and reactor wall.

In one and the same stirring reactor there may also be used stirring discs of different geometries, for instance conventional ring discs in the zones remote from the discharge region and perforated stirring discs in the discharge region. Preferably, the spokes of the stirring discs of a reactor are helically offset with respect to each other in axial direction, so that a better axial exchange of product is possible.

EXAMPLES

The geometry of the stirring reactors used in the subsequent examples can be taken from Table 2.

TABLE 2

| Pilot plant | A | B[1] | C |
|---|---|---|---|
| Reactor type acc. to Table 1 | II | | III |
| Comparative case (acc. to FIG.) | FIG. 1 | | FIG. 3 |
| Reactor volume V [m³] | 0.78 | | 18.4 |
| Nominal diameter[2] D [mm] | 1278 | | 3280 |
| Relative length L/D [–] | 0.59 | | 0.76 |
| Length percentages | | | |
| cylindrical region $L_z$ (%) | 24.2 | 33.6 | 42.4 |
| 1st conical region $L_{k1}$ (%) | 51.0 | 51.0 | 28.8 |
| 2nd conical region $L_{k2}$ (%) | 24.8 | 15.4 | 28.8 |
| Cone angle of inclination[3] | | | |
| cone (1) $\alpha_1$ (deg) | 30° | 30° | 29° |
| displacement cone $\alpha_2$ (deg) or cone (2) | 30° | 45° | 29° |
| Local differential entraining-surface density (ESD)[4] = $\Delta A/\Delta V$ [m²/m³] | | | |
| in discharge region, min. ESD [m²/m³] | 7.87 | 6.07 | 5.14 |
| at cone end, max. ESD [m²/m³] | 9.73 | 7.40 | 6.23 |
| Stirring disc concept | Ring discs | | Ring discs |
| Spokes per stirring disc $Z_{sp}$ [–] | 3 | | 4 |
| Gross distance between stirring discs[5] a [mm] | 83 | 107 | 131 |

[1] plant B is a modification of plant A
[2] $D = D_{max}$
[3] with respect to the horizontal
[4] defined with the axial projection surfaces of the stirring discs and spokes (without shaft)
[5] distance between the centre of a stirring disc and the centre of the next stirring disc

Example 1

Proceeding from 212 kg terephthalic acid (TPA) and 90 kg ethylene glycol (EG), about 245 kg PET were periodically produced as melt in a pilot plant in a discontinuous esterification and polycondensation process and processed to obtain granules, the start-up losses of 2 to 2.5% deducted.

Prepolycondensation and polycondensation were performed in the presence of 180 ppm Sb and 10 ppm P, which had previously been supplied to the process as antimony triacetate or as phosphoric acid in glycolic solution.

Temperature and pressure of the prepolycondensation ended at 276° C. and 60 mbar; prepolymer samples revealed a TPA conversion of 98.6% and an intrinsic viscosity IV in the range from 0.165 to 0.17 dl/g.

In about 5 min, the precondensate was transferred to a stirring-disc autoclave Type B in accordance with Table 2 by means of nitrogen pressure, which autoclave was provided to receive the batch with a reduced vacuum of about 250 mbar after granulating the preceding batch and closing the discharge valve.

Special features of the polycondensation program were
 a liquid HTM heating of the reactor and the product circulation line with 276° C.,
 a constant, external product circuit of 300 kg/h between outlet port and centrally disposed recirculation port,
 program start with initially constant rotational speed of the stirring discs of 9 rpm until the moment limitation of 50% of the maximum available drive moment is reached; subsequent speed reduction with constant guiding moment up to the final rotational speed of about 4 rpm,
 pressure decrease to 1.1 mbar after 60 min or to the final value of 0.8 mbar after about 90 min,
 a final process temperature of 280° C.,
 end of program after 117 to 120 min when reaching a target pressure of about 40 bar in the circulation line by stopping the stirrer and change to a lower, stabilizing vacuum of 25 mbar.

The granulation of the product melt started upon rinsing the chip bypass about 3 min after stopping the stirrer and took about 38 min. During granulation the vacuum reduced to about 34 mbar.

Three chip samples "S1", "S2" and "S3" were drawn after the 2nd, the 17th and the 32nd minute and examined for uniformity of the intrinsic viscosity as well as for the content of terminal carboxyl groups of the middle sample. The results were:

$IV_1$=0.640; $IV_2$=0.641; $IV_3$=0.641, each in dl/g
COOH=22 eq/t (sample S2)

The melt viscosity achieved was about 380 Pa·s, the relative filling level h/D=about 0.325.

The initial shear rate gradient in the outer region of the stirrer and the reactor wall was in the range from about 5 to 25 s$^{-1}$.

Example 2

In a pilot plant, comparable to the one in Example 1, about 222 kg polypropylene terephthalate (PTT) were discontinuously produced as melt in the presence of 85 ppm titanium, which was added in the form of tetrabutyl titanate, proceeding from 180 kg terephthalic acid (TPA) and 107 kg 1,3-propane diol (PDO), and granulated with a yield of about 95%.

Upon esterification, a prepolycondensation was performed with a final temperature of 256° C. and a final pressure of 50 mbar. The precondensate revealed a TPA conversion of about 99.9% and an intrinsic viscosity IV=about 0.17 dl/g.

With a speed control and pump delivery comparable to Example 1 for the outer product circulation, polycondensation was effected with a vacuum of about 1.0 mbar after 60 minutes and a final vacuum of 0.5 mbar after about 150 minutes. There was a stationary accompanying HTM heating with 254° C. At the end of the polycondensation after about 156 minutes, the product temperature had risen to 262° C. and the rotational speed had decreased from initially 8.8 rpm to 3.5 rpm.

3 minutes after stopping the stirrer, the 33 minutes granulation of the melt was started at a reactor vacuum of 0.5 mbar. The chip samples "S1" (after two minutes) and "S3" (after 30 minutes) revealed the same solution viscosities, IV=0.940 dl/g. The content of terminal carboxyl groups of the middle sample "S2" (after 16 minutes) was determined to be COOH=11 eq/t.

The relative filling level upon stopping the stirrer is calculated to be h/D=about 0.30. The dynamic melt viscosity at the end of the batch was determined to be about 350 Pa·s.

Example 3

In the transesterification and polycondensation process in a pilot plant, 283 kg polybutylene terephthalate (PBT) were produced and granulated by using 250 kg dimethyl terephthalate (DMT) and 151 kg 1,4-butanediol (BDO) and by using 45 ppm Ti as tetraisopropyl titanate.

The prepolycondensation was terminated with a vacuum of 80 mbar at 236° C. For the further polycondensation, the precondensate was supplied to a stirring reactor Type A according to Table 2 and polycondensated with a DMT conversion of 99.5% and a solution viscosity IV=0.16 dl/g.

The essential reaction parameters were:
a polycondensation time of 170 min,
a rotational speed of 6.7 rpm constant for about 100 min and a linear decrease in the rotational speed from 6.7 to 1.2 rpm for another hour, thereafter a constant rotational speed of 1.0 rpm,
a vacuum of 1.5 mbar after 60 min and a final vacuum of 1.2 mbar after about 150 min,
a product temperature increased from 236° C. to finally 251° C.,
an accompanying HTM temperature of 243° C. at the reactor shell or 240° C. at the outer product line,
a product circulation capacity of 180 kg/h.

Granulation was effected about 12 min after stopping the stirrer under a vacuum of 13 to 20 mbar for a period of 40 min by recovering the chip samples S1 after 3 min, S2 after 19 min, and S3 after 35 min and with the measurement results $IV_1=1.01$; $IV_2=1.02$; $IV_3=1.02$, each in dl/g, COOH=32 meq/kg (sample S2).

The evaluation by way of calculation revealed
a relative filling level h/D=0.38,
an initial shear rate gradient of about 4 to 20 $s^{-1}$,
a final dynamic viscosity of the polymer of about 480 Pa·s.

Example 4

In the pilot plant Type A according to Example 3, 254 kg PBT melt were periodically produced proceeding from 225 kg DMT and 196 kg BDO by using 110 ppm Ti (as tetraisopropyl titanate), and were granulated by deducting a loss of about 6%.

The prepolycondensation was concluded with a temperature of 233° C. and a prevacuum of 77 mbar.

The prepolymer was supplied to the succeeding stirring reactor with a DMT conversion of about 99.6% and an intrinsic viscosity IV=0.18 dl/g and polycondensated under the conditions given below:
rising temperature up to 244° C.,
initial and final HTM temperature of 255° C. and 235° C., respectively,
final pressure after 150 min=0.8 mbar,
polycondensation time=190 min,
initial speed=5 rpm, with a torque limitation to 25% decreasing to 0.26 rpm,
product circulation capacity of about 240 kg/h, decreasing to 120 kg/h.

Granulation was effected after 10 minutes standstill of the stirrer under a reactor vacuum of 0.8 mbar for 44 minutes.

The analysis results of the chip samples, from the beginning/middle/end of the granulation were as follows:
$IV_1=1.18$; $IV_2=1.18$; $IV_3=1.18$, each in dl/g,
COOH=57 eq/t (sample S2)
Further parameters were:
a relative filling level, h/D=about 0.35,
final product viscosity=about 1140 Pa·s,
initial shear rate gradient in the vicinity of the stirring disc=about 6 to 10 $s^{-1}$, in the vicinity of the wall=about 3 to 15 $s^{-1}$.

Example 5

Comparative Example

In the pilot plant according to Example 4, high-viscosity PBT was produced by means of a stirring reactor Type A according to Table 2 with comparable amounts and filling conditions in a transesterification process by using 55 ppm Ti (as tetraisopropyl titanate) in the PBT.

The prepolycondensation was terminated with 230° C. at 55 mbar; the DMT conversion in the precondensate was about 99.7%, the solution viscosity IV=about 0.17 dl/g.

The conditions existing during polycondensation were as follows:
a final polycondensate temperature=235° C.,
a final vacuum 1.0 mbar,
initial speed=5 rpm with a torque limitation of 53%, decreasing to 0.5 rpm,
a polycondensation time=260 min,
outer product circulation of about 240 kg/h, decreasing to about 100 kg/h.

Granulation was effected after 10 minutes standstill of the stirrer under a reactor vacuum of 1.0 mbar for 72 minutes.

The analysis results of the chip samples from the beginning, the middle and at the end of granulation were as follows:
$IV_1=1.21$; $IV_2=1.23$; $IV_3=1.36$, each in dl/g
COOH=33 eq/t (sample S2)
The measured viscosities of Comparative Example 5 corresponded to a melt viscosity increasing in the course of granulation in the range of
η=about 1600 to 2800 Pa·s.

With these final viscosities lying outside the inventive range a satisfactory drainage of the reactor was not possible.

Example 6

Proceeding from 6244 kg terephthalic acid, 141 kg isophthalic acid as well as 2836 kg ethylene glycol and 37 kg diethylene glycol, 7428 kg copolyester melt were produced in batches in a production plant and processed to obtain 7.4 t granules. Based on the polymer, 250 ppm Sb as antimony trioxide ($Sb_2O_3$) were used as catalyst.

Precondensation was performed at a final temperature of 278° C. and a vacuum of 250 mbar with an acid conversion of about 98.2% and a solution viscosity IV=0.157 dl/g.

The precondensation batch was transferred into a stirring reactor Type C according to Table 2 within a maximum of 5 minutes.

The control of the polycondensation was effected substantially on the basis of the following process parameters:
a constant initial speed of 26 rpm for 27 minutes, an almost linear decrease of the rotational speed within 55 minutes to the stationary final value of the rotational speed of about 4.8 rpm,
an increase in vacuum from about 200 mbar at the beginning to 1.1 mbar after 30 minutes and a final value of 0.7 mbar after 80 minutes,
an increase in temperature to 279° C. after 60 minutes and 282° C. at the end of the batch, after 96 minutes,
an external product circulation in longitudinal direction from the central outlet of about 24.8 t/h for 78 minutes, linearly decreasing to a constant desired value of 12.4 t/h after 90 minutes with a symmetrical division of the circuit over both sides of the cover,
an accompanying HTM heating of the reactor with about 276° C. for 60 minutes, reduced to about 260° C. after 80 minutes, an accompanying HTM heating of the circulation line with initially 276° C. for about 75 minutes, reduced to about 260° C. after about 90 minutes.

The termination of the reaction was effected upon reaching the reference pressure in the circuit line by stopping the stirrer and reducing the vacuum to about 30 mbar.

4 minutes later, granulation started, which ended after 43 minutes. By half the granulation time, the vacuum was reduced to a constant final value of about 75 mbar.

For quality control, 3 chip samples S1, S2, S3 were drawn at the beginning, in the middle and at the end of the granulation and analysed with respect to the solution viscosity and the concentration of terminal carboxyl groups, with the following results:

$IV_1$=0.631; $IV_2$=0.632; $IV_3$=0.632, each in dl/g,
COOH=35 eq/t (sample S2)
Further parameters were:
a filling level h/D=0.39,
a dynamic product viscosity of about 250 Pa·s,
an initial shear rate gradient in the range from about 30 to 105 $s^{-1}$.

Example 7

In the production plant in accordance with Example 6, random samples of the granules were taken as middle sample "S2" in the ongoing batch cycle by means of a procedure comparable to Example 6 and examined with regard to the solution viscosity.

The following results were obtained:

| Batch No. | 1 | 4 | 7 | 10 |
|---|---|---|---|---|
| IV [dl/g] | 0.632 | 0.632 | 0.633 | 0.633 |
| COOH [eq/t] | 35 | 36 | 35 | 35 |

In Examples 1, 2, 6, 7 the determination of the intrinsic viscosity was effected by means of a 0.5% solution of the polymer at 25° C. in o-dichlorobenzene/phenol with a mixing ratio of 3:2 parts by weight. In Examples 3, 4, 5 tetrachloroethane was used instead of o-dichlorobenzene.

The corresponding melt viscosities were derived from empirical tables of the melt viscosity as a function of the intrinsic viscosity and the product temperature or were determined directly in the cone/plate rheometer.

The determination of the content of terminal carboxyl groups was effected by means of the potentiometric titration with 0.05-molar methanolic potassium hydroxide solution in o-cresol/chloroform (70:30 parts by weight).

The monomer conversion α in the esterification process was calculated from the determination of the acid number (AN) and and saponification number (SN) performed as usual, each in mg KOH/g, in the allocation α=1−(AN/SN). In the transesterification process, the DMT conversion is derived from the analogous determination of the concentration of methoxy groups m (in meq/g) in relation to the total groups, $m_o$=f·SN, which were derived from the saponification number with the conversion factor f=0.01782 meq/mg KOH.

The analysis of the methoxy groups was effected by means of a release of the bound methanol by alkaline saponification at 150° C. in the closed system and subsequent determination of methanol by gas chromatography.

The invention claimed is:

1. A stirring reactor having horizontal axis and comprising vertical product entraining surfaces as well as at least one filling port, at least one recirculation port, one vapor port, one outlet port and means for heating the reactor for the discontinuous polycondensation of a precondensate to obtain a polycondensation polymer with a dynamic viscosity in the range from about 100 to 1600 Pa·s at the respective polycondensation temperature, wherein
   a) the reactor comprises a housing the interior shape of which approximates that of a horizontal, single or double truncated cone tapered in the direction of both sides of the reactor wherein the taper is of different lengths on each side of the reactor, said truncated cone having a wall angle of inclination α in the range from 5 to 45°, the walls of which are optionally spherically curved, and optionally a coaxial cylindrical housing section adjoining the end or ends of the conical section or sections having the largest diameter, the outlet port being disposed in the section of the reactor having the largest diameter and at least one recirculation port being remote from the outlet port,
   b) the product entraining surfaces consist of a plurality of mutually parallel rotatable stirring discs, where the entraining surfaces are concentrated on the outer reactor region close to the wall, and the entraining-surface density in the vicinity of the outlet port is 1 to 8 $m^2$ per $m^3$ reactor space and constantly increases with increasing axial distance from the outlet port up to a value which is 5 to 35% higher, said rotatable stirring discs comprising free edge zones, interruptions of the outer stirrer contour, permeable entraining surfaces, or combinations thereof,
   c) at least one stationary baffle plate is disposed centrally between two stirring discs, and
   d) the outlet port is connected with the at least one recirculation port via a product pump and at least one circulation line.

2. The stirring reactor of claim 1, wherein said at least one baffle plate is arranged at about half the reactor height.

* * * * *